(12) United States Patent
Hsiao et al.

(10) Patent No.: US 8,760,140 B2
(45) Date of Patent: Jun. 24, 2014

(54) APPARATUS FOR AUTO-REGULATING INPUT POWER SOURCE OF DRIVER

(75) Inventors: Ho-Pu Hsiao, Taipei (TW); Nung-Te Huang, Taipei (TW); Chih-Wan Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1077 days.

(21) Appl. No.: 12/641,290

(22) Filed: Dec. 17, 2009

(65) Prior Publication Data

US 2010/0164460 A1 Jul. 1, 2010

(30) Foreign Application Priority Data

Dec. 31, 2008 (TW) .............................. 97151895 A

(51) Int. Cl.
G05F 1/56 (2006.01)
G05F 1/565 (2006.01)

(52) U.S. Cl.
USPC .......................................... 323/284; 323/285

(58) Field of Classification Search
USPC ................. 323/259, 266, 268–271, 273–282, 323/284–286
See application file for complete search history.

(56) References Cited

U.S. PATENT DOCUMENTS

| | | | |
|---|---|---|---|
| 6,188,206 B1 | 2/2001 | Nguyen et al. | |
| 6,198,262 B1* | 3/2001 | Squibb et al. | 323/273 |
| 6,882,130 B2 | 4/2005 | Handa et al. | |
| 6,912,141 B2 | 6/2005 | Konno | |
| 7,064,530 B2* | 6/2006 | Vogman | 323/267 |
| 7,446,515 B2* | 11/2008 | Wang | 323/280 |
| 7,508,176 B2* | 3/2009 | Hartular et al. | 323/268 |
| 7,701,181 B2* | 4/2010 | Inoue | 323/268 |
| 7,710,091 B2* | 5/2010 | Huang | 323/280 |
| 7,764,111 B2* | 7/2010 | Chiu et al. | 327/540 |
| 7,859,325 B2* | 12/2010 | Chiu et al. | 327/540 |
| 2005/0248325 A1* | 11/2005 | Adachi | 323/273 |
| 2007/0139025 A1* | 6/2007 | Vinn et al. | 323/273 |
| 2008/0174289 A1* | 7/2008 | Gurcan et al. | 323/280 |
| 2008/0224673 A1* | 9/2008 | Chien et al. | 323/271 |
| 2009/0039844 A1* | 2/2009 | Hoshino et al. | 323/273 |

(Continued)

FOREIGN PATENT DOCUMENTS

| | | |
|---|---|---|
| CN | 101218735 | 7/2008 |
| CN | 101295204 | 10/2008 |
| JP | 2007020352 | 1/2007 |

OTHER PUBLICATIONS

"First Office Action of China Counterpart Application", issued on Jul. 26, 2011, p. 1-p. 3.

(Continued)

*Primary Examiner* — Adolf Berhane
*Assistant Examiner* — Nusrat Quddus
(74) *Attorney, Agent, or Firm* — Jianq Chyun IP Office

(57) ABSTRACT

An apparatus for auto-regulating the input power source of a driver is provided. The apparatus includes a load detector and a controller. The load detector detects a load current and outputs a detection signal according to the load current. The controller is coupled to the load detector and receives the detection signal. The controller provides an operation voltage between a first voltage and a second voltage, wherein the first voltage is lower than the second voltage. The operation voltage is supplied to the driver and regulated flexibly according to different load demand. In the light loading, the device for auto-regulating the input power source can improve the use efficiency of electric power.

9 Claims, 3 Drawing Sheets

(56) References Cited

U.S. PATENT DOCUMENTS

2010/0013450 A1*  1/2010  Huang et al. .................. 323/282
2010/0134078 A1*  6/2010  Murakami et al. ............ 323/271
2010/0164452 A1*  7/2010  Ruan et al. .................... 323/282

OTHER PUBLICATIONS

"Office Action of Taiwan counterpart application" issued on Sep. 27, 2012, p. 1-p. 10.

* cited by examiner

APPARATUS FOR AUTO-REGULATING INPUT POWER SOURCE OF DRIVER

CROSS-REFERENCE TO RELATED APPLICATION

This application claims the priority benefit of Taiwan application serial no. 97151895, filed on Dec. 31, 2008. The entirety of the above-mentioned patent application is hereby incorporated by reference herein and made a part of specification.

BACKGROUND OF THE INVENTION

1. Field of the Invention

The invention relates to a power-saving technique and, more particularly, to an apparatus for auto-regulating an input power source of a driver.

2. Description of the Related Art

The issue of power-saving is becoming more and more important.

FIG. 1 is a block diagram showing a constant voltage source provided for a driver. As shown in FIG. 1, conventionally, the voltage of a power source input end $V_{CC}$ provided to a driver is a voltage source. The voltage source of the driver may be 5V or 12V. The central processing unit (CPU) on the motherboard is driven by directly providing a constant voltage source to the driver. However, the CPU is always in a light load state when a common user uses a computer, and the CPU is in a heavy load state only when it does intensive computing occasionally. Since the load varies with the usage of the motherboard, it is wasteful to provide 12V to the driver when the motherboard is in a light load state.

When the system is in a heavy load state, the voltage for driving the power switching components should be high. However, when the system is in a light load state, the voltage for driving the power switching components does not need a high voltage. As a result, the conventional manner of providing power by a constant voltage source is not flexible. The power source of the driver cannot be changed no matter whether the system is in a light load state or a heavy load state, and it results in an unnecessary loss of driving.

BRIEF SUMMARY OF THE INVENTION

The invention provides an apparatus for auto-regulating the input power source of a driver. The supplied voltage is regulated according to the load current which the driver drives, and then the electric power is not wasteful.

The invention provides an apparatus for auto-regulating the input power source of a driver. The apparatus includes a load detector and a controller. The load detector detects load current, and outputs a detection signal according to the load current. The controller is coupled to the load detector and receives the detection signal. The controller provides an operation voltage between a first voltage and a second voltage, wherein the first voltage is lower than the second voltage, and the operation voltage is supplied to the driver.

As shown above, the apparatus for auto-regulating the input power source of a driver can auto-detect the using state of the system. The input voltage source is supplied to the driver and regulated flexibly according to different load demand. As a result, unnecessary power loss is reduced greatly. In the light loading, the device for auto-regulating the input power source improves the use efficiency of electric power and solves the problem of the power loss in the light loading in conventional method. Furthermore, it solves the problem of the design of a power source.

These and other features, aspects, and advantages of the invention will become better understood with regard to the following description, appended claims, and accompanying drawings.

DETAILED DESCRIPTION OF THE EMBODIMENTS

Figure 1:
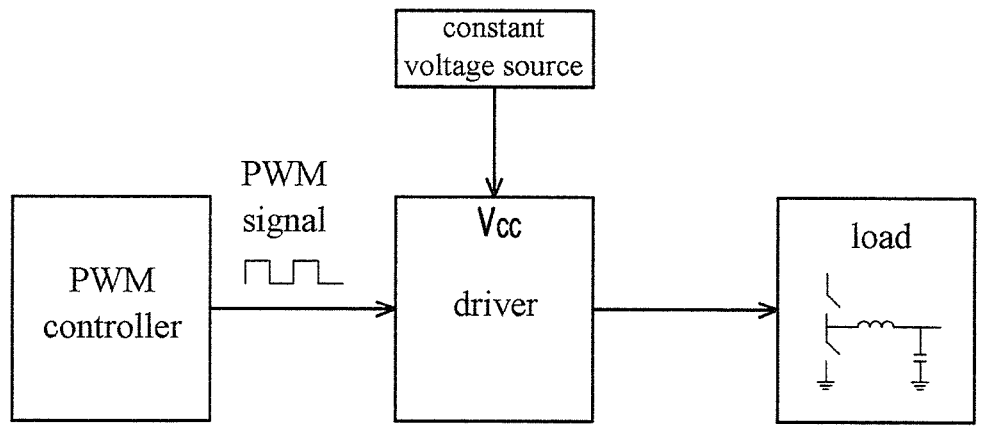
FIG. 1 is a block diagram showing a driver provided with a constant voltage source.
Figure 2:
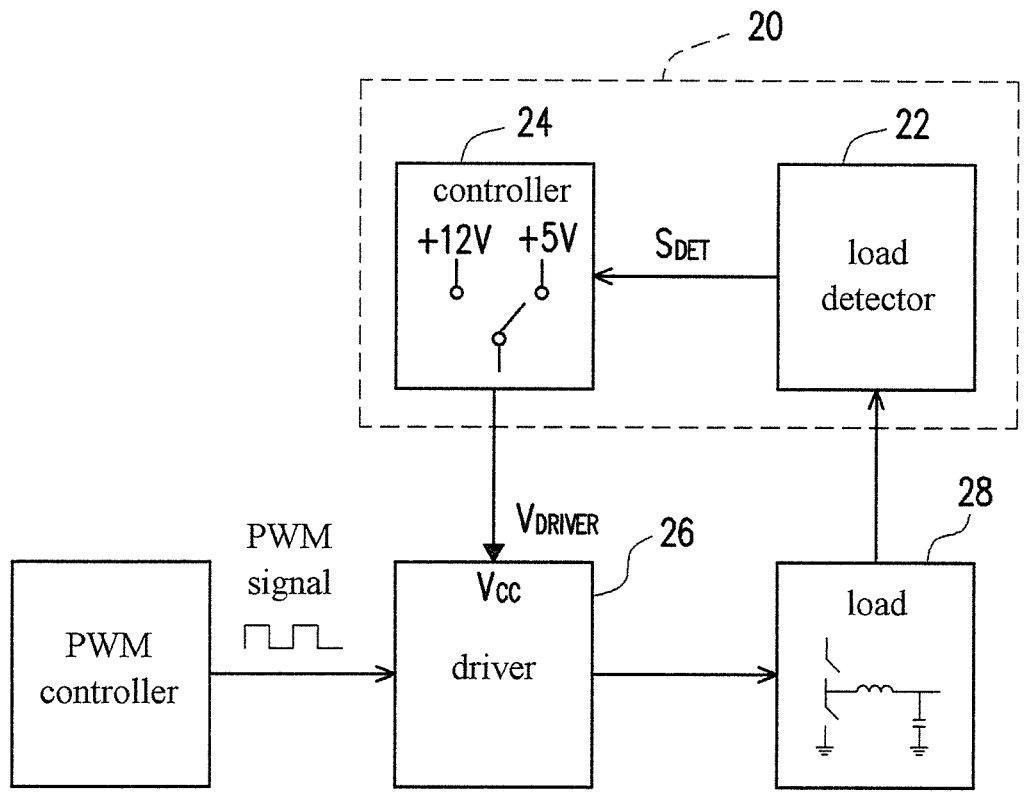
FIG. 2 is a block diagram showing an apparatus for auto-regulating the input power source of a driver according to an embodiment of the invention.

FIG. 2 is a block diagram showing an apparatus for auto-regulating the input power source of a driver according to an embodiment of the invention. As shown in FIG. 2, the apparatus 20 for auto-regulating the input power source of a driver includes a load detector 22 and a controller 24. The load detector 22 detects the using state of a load 28 on a motherboard and outputs a voltage signal to reflect the detected current. That is, the load detector 22 outputs a detection signal $S_{DET}$ according to different load current. The voltage signal outputted by the load detector 22 is proportionate to the detected current. The controller 24 is coupled to the load detector 22, and it receives the detection signal $S_{DET}$. The controller 24 provides an operation voltage $V_{DRIVER}$ according to the detection signal $S_{DET}$, wherein the operation voltage $V_{DRIVER}$ is between the first voltage (+5V) and the second voltage (+12V). The apparatus 20 for auto-regulating the input power source of a driver transfers the operation voltage $V_{DRIVER}$ to the power source input end $V_{CC}$ of the driver 26. For example, the apparatus 20 for auto-regulating the input power source of a driver may switch to the second voltage (+12V) when the motherboard is used in the heavy load state. The apparatus for auto-regulating 20 the input power source of a driver may switch to the first voltage (+5V) when the motherboard is used in the light load state. The criterion for determining whether the load is heavy or light is designed by a design engineer according to the actual demand. As a result, the voltage source supplied to the driver 26 may be switched flexibly by the apparatus 20 for auto-regulating the input power source of a driver. Thus, the unnecessary driving loss is reduced, and the use efficiency of electric power is improved.

According to this embodiment of the invention, the apparatus for auto-regulating the input power source of a driver determines whether the system is in the light load state or the heavy load state, and then it regulates the voltage source of the driver. As a result, the driving loss is reduced when the system is in the light load, and the system efficiency is improved.

Figure 3:
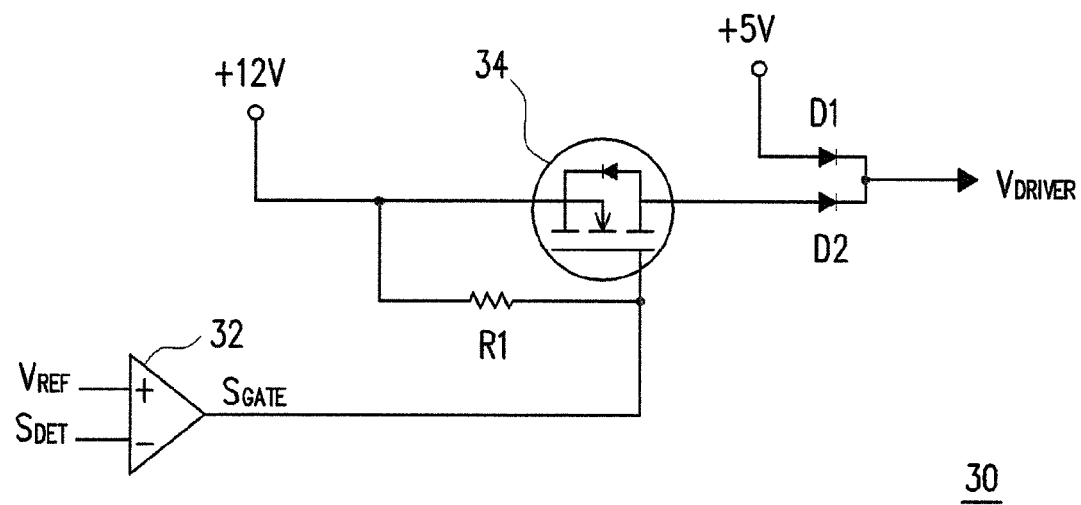
FIG. 3 is a circuit diagram of a controller according to the first embodiment of the invention.

FIG. 3 is a circuit diagram of a controller according to the first embodiment of the invention. As shown in FIG. 3, the aforesaid criterion for determining whether the load is heavy or light may further be implemented via a reference signal $V_{REF}$. The reference signal $V_{REF}$ may be a voltage value of a resistance divider (not shown). The controller 30 may compare the detection signal $S_{DET}$ and the reference signal $V_{REF}$ by a comparator 32. The first input end of the comparator 32 receives the reference signal $V_{REF}$, and the second input end of the comparator 32 receives the detection signal $S_{DET}$. Afterward, the power source is switched to provide the operation voltage $V_{DRIVER}$ to the driver (not shown) according to a comparative result $S_{GATE}$ of the comparator 32. For example, the system is in the light load state and the output of the comparator 32 is a logic high level when the detection signal $S_{DET}$ is not higher than the reference signal $V_{REF}$, and the first voltage (+5V) may be provided to the driver to work. Otherwise, the system is in the heavy load state and the output of the comparator 32 is a logic low level when the detection signal $S_{DET}$ is higher than the reference signal $V_{REF}$, and the second voltage (+12V) may be provided to the driver to work.

As shown in FIG. 3, the controller 30 is a two-stage voltage regulator. The controller 30 includes a semiconductor switch 34, a resistor R1, a comparator 32, diodes D1 and D2. The first end of the diode D1 is coupled to the first voltage (+5V). The semiconductor switch 34 may be a P-TYPE semiconductor switch. The first source/drain electrode of the semiconductor switch 34 is coupled to the second voltage (+12V). The first end of the resistor R1 is coupled between the first source/drain electrode and the gate electrode of the semiconductor switch 34. The second source/drain electrode of the semiconductor switch 34 is coupled to the first end of the diode D2. The second end of the diode D2 is coupled to the second end of the diode D1. The operation voltage $V_{DRIVER}$ is provided by the coupling position of the two diodes. The comparator 32 controls the gate electrode of the semiconductor switch 34 according to comparative result $S_{GATE}$ resulting from the detection signal $S_{DET}$ and the reference signal $V_{REF}$. There are two power source output paths of the operation voltage $V_{DRIVER}$. The first power source output path is that the first voltage (+5V) is used to output the DRIVER via the diode D1. The second power source output path is that the second voltage (+12V) is used to output the operation voltage $V_{DRIVER}$ via the semiconductor switch 34 and the diode D2. That is, the first voltage (+5V) is provided to the driver when the semiconductor switch 34 is turned off, and the second voltage (+12V) is provided to the driver when the semiconductor switch 34 is turned on.

Figure 4:
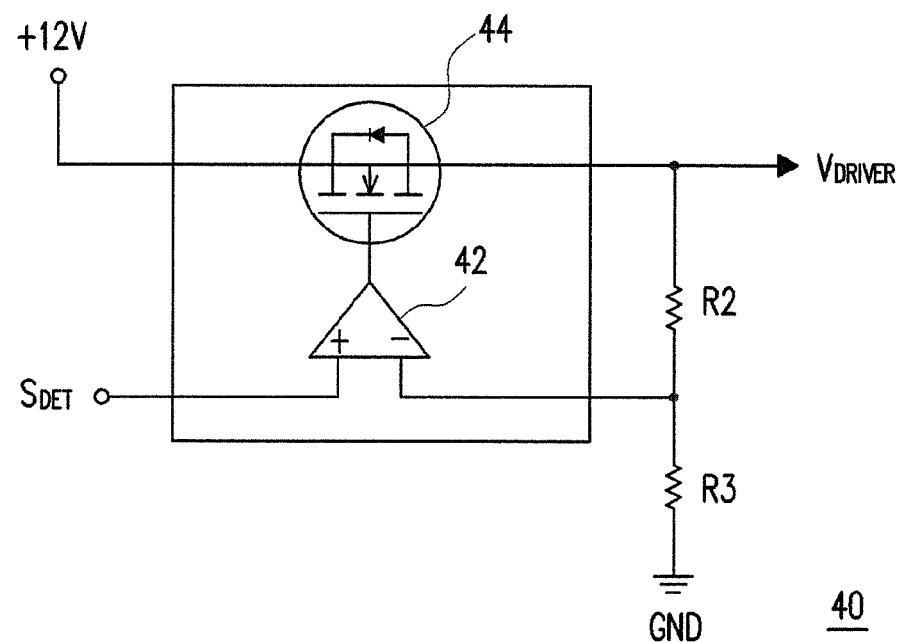
FIG. 4 is a circuit diagram of a controller according to the second embodiment of the invention.

FIG. 4 is a circuit diagram of a controller according to the second embodiment of the invention. As shown in FIG. 4, the controller 40 is a low dropout regulator (LDO). The controller 40 includes a resistor R2, a resistor R3, a semiconductor switch 44, and an operational amplifier 42. The semiconductor switch 44 may be an N-TYPE semiconductor switch. The first source/drain electrode of the semiconductor switch 44 is coupled to the second voltage (+12V). The second source/drain electrode of the semiconductor switch 44 is coupled to the first end of the resistor R2, and the operation voltage $V_{DRIVER}$ is provided from the second source/drain electrode of the semiconductor switch 44. The first end of the resistor R3 is coupled to the second end of the resistor R2. The second end of the resistor R3 is coupled to a ground voltage GND. The "+" input end of the operational amplifier 42 is coupled to the detection signal $S_{DET}$. The "−" input end of the operational amplifier 42 is coupled to the first end of the resistor R3. The output end of the operational amplifier 42 is coupled to the gate electrode of the semiconductor switch 44. The operation voltage $V_{DRIVER}$ is linearly increased with the increase of the load current, and it is linearly decreased with the decrease of the load current of the system. The operation voltage $V_{DRIVER}$ varies proportionately to the magnitude of the detection signal $S_{DET}$, and the minimal value of operation voltage $V_{DRIVER}$ equals to the first voltage.

Figure 5:
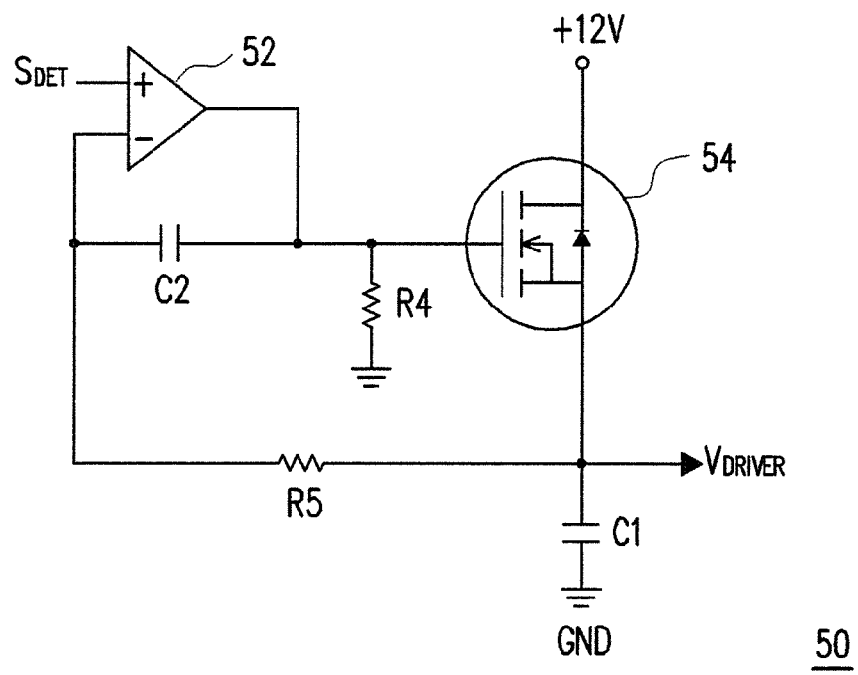
FIG. 5 is a circuit diagram of a controller according to the third embodiment of the invention.

FIG. 5 is a circuit diagram of a controller according to the third embodiment of the invention. As shown in FIG. 5, the controller 50 is a linear voltage regulator. The controller 50 includes resistors R4 and R5, capacitors C1 and C2, a semiconductor switch 54, and an operational amplifier 52. The semiconductor switch 54 may be an N-TYPE semiconductor switch. The second source/drain electrode of the semiconductor switch 54 is coupled to the second voltage (+12V). The first source/drain electrode of the semiconductor switch 54 is coupled to the first end of the capacitor C1 and the first end of the resistor R5, and the operation voltage $V_{DRIVER}$ is provided by the first source/drain electrode of the semiconductor switch 54. The "+" input end of the operational amplifier 52 is coupled to the detection signal $S_{DET}$, and the "−" input end of the operational amplifier 52 is coupled to the second end of the resistor R5. In addition, the output end of the operational amplifier 52 is coupled to the gate electrode of the semiconductor switch 54. The first end of the capacitor C1 is coupled to the first end of the resistor R5. The second end of the capacitor C1 is coupled to a ground voltage GND. The first end of the capacitor C2 is coupled to the first end of the resistor R4. The second end of the capacitor C2 is coupled to the second end of the resistor R5. The second end of the resistor R4 is coupled to a ground voltage GND. The output end of the operational amplifier 52 can auto-regulate the voltage across the semiconductor switch 54, and then the operation voltage $V_{DRIVER}$ is equal to the detection signal $S_{DET}$ from the "+" input end of the operational amplifier 52. As a result, the operation voltage $V_{DRIVER}$ is linearly increased with the increase of the load current of the system, and it is linearly decreased with the decrease of the load current of the system. The operation voltage $V_{DRIVER}$ varies proportionately to the magnitude of the detection signal $S_{DET}$, and the minimal value of operation voltage $V_{DRIVER}$ equals to the first voltage.

Figure 6:
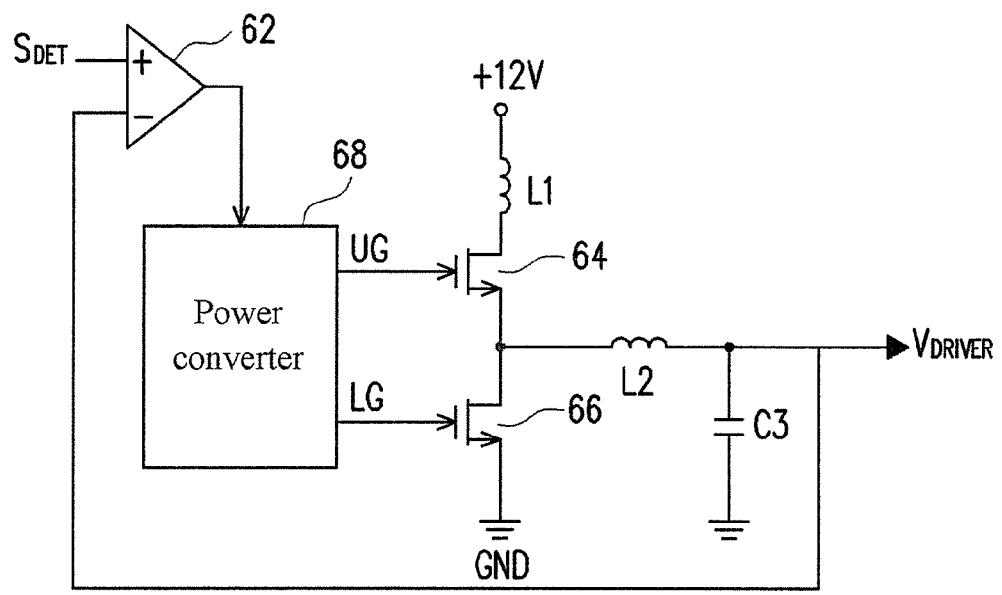
FIG. 6 is a circuit diagram of a controller according to the fourth embodiment of the invention.

FIG. 6 is a circuit diagram of a controller according to the fourth embodiment of the invention. As shown in FIG. 6, the controller 60 is a switch-mode power converter. The controller 60 includes an inductor L1, an inductor L2, a capacitor C3, a semiconductor switch 64, a semiconductor switch 66, an operational amplifier 62, and a power converter 68. The first end of the inductor L1 is coupled to the second voltage (+12V). The second end of the inductor L2 provides the output of the operation voltage $V_{DRIVER}$. The semiconductor switches 64 and 66 may be N-TYPE semiconductor switches. The first source/drain electrode of the semiconductor switch 64 is coupled to the second end of the inductor L1. The second source/drain electrode of the semiconductor switch 64 is coupled to the first end of the inductor L2 and the first source/drain electrode of the semiconductor switch 66. The second source/drain electrode of the semiconductor switch 66 is coupled to a ground voltage GND. The first end of the capacitor C3 is coupled to the second end of the inductor L2. The second end of the capacitor C3 is coupled to a ground voltage GND. The "+" input end of the operational amplifier 62 is coupled to the detection signal $S_{DET}$. The "−" input end of the operational amplifier 62 is coupled to the second end of the inductor L2. The power converter 68 receives the output voltage of the operational amplifier 62 to start the power converter 68. The up gate (UG) driving pin of the power converter 68 is coupled to the gate electrode of the semiconductor switch 64. The lower gate (LG) driving pin of the power converter 68 is coupled to the gate electrode of the semiconductor switch 66. The power converter 68 controls the gate electrodes of the semiconductor switches 64 and 66 and regulates the outputted operation voltage $V_{DRIVER}$. The operation voltage $V_{DRIVER}$ equals to the detection signal $S_{DET}$. As a result, the operation voltage $V_{DRIVER}$ is linearly increased with the increase of the load current of the system, and it is linearly decreased with the decrease of the load current of the system. The operation voltage $V_{DRIVER}$ varies proportionately to the magnitude of the detection signal $S_{DET}$, and the minimal value of operation voltage $V_{DRIVER}$ equals to the first voltage.

As shown above, the apparatus for auto-regulating the input power source of a driver can auto-detect the using state of the system. The operation voltage is supplied to the driver and regulated flexibly according to different load demand. Furthermore, the apparatus for auto-regulating the input power source of a driver includes at least the following advantages.

First, a voltage step-down mechanism for a power source of a driver is provided.

Second, an input power source of a driver is switched according to the using state of the motherboard, and power-saving is realized in the light load state.

Third, the driving loss is effectively reduced when the system is in the light load ato improve the efficiency of the system.

Fourth, the power source is auto-regulated to optimize the efficiency of the power conversion.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An apparatus for auto-regulating an input power source of a driver, comprising:
    a load detector detecting a load current and outputting a detection signal according to the load current; and
    a controller coupled to the load detector to receive the detection signal and providing an operation voltage between a first voltage and a second voltage according to the detection signal, wherein the operation voltage is provided to the driver, and the first voltage is lower than the second voltage,
    wherein the controller compares the detection signal and a reference signal, the first voltage is provided to the driver when the detection signal is not higher than the reference signal, and the second voltage is provided to the driver when the detection signal is higher than the reference signal.

2. The apparatus for auto-regulating the input power source of the driver of claim 1, wherein the controller comprises:
    a first semiconductor switch, wherein a first source or drain electrode of the first semiconductor switch is coupled to the second voltage;
    a first resistor coupled between a first source or drain electrode and a gate electrode of the first semiconductor switch;
    a first diode, wherein a first end of the first diode is coupled to the first voltage;
    a second diode, wherein a first end of the second diode is coupled to a second source or drain electrode of the first semiconductor switch, and a second end of the second diode is coupled to a second end of the first diode and provided to output the operation voltage; and
    a comparator, wherein a first input end of the comparator receives a reference signal, a second input end of the comparator receives the detection signal, and the comparator produces a comparative result to control a gate electrode of the first semiconductor switch.

3. The apparatus for auto-regulating the input power source of the driver of claim 2, wherein the first semiconductor switch is a P-TYPE semiconductor switch.

4. The apparatus for auto-regulating the input power source of the driver of claim 1, wherein the controller comprises:
    a second resistor;
    a third resistor, wherein a first end of the third resistor is coupled to a second end of the second resistor, and a second end of the third resistor is coupled to a ground voltage;
    a second semiconductor switch, wherein a first source or drain electrode of the second semiconductor switch is coupled to the second voltage, a second source or drain electrode of the second semiconductor switch is coupled to a first end of the second resistor, and the operation voltage is provided by the second source or drain electrode of the second semiconductor switch; and
    a first operational amplifier, wherein a first input end of the first operational amplifier is coupled to the detection signal, a second input end of the first operational amplifier is coupled to a first end of the third resistor, and an output end is coupled to a gate electrode of the second semiconductor switch,
    wherein the operation voltage varies with the magnitude of the detection signal proportionately.

5. The apparatus for auto-regulating the input power source of the driver of claim 4, wherein the second semiconductor switch is an N-TYPE semiconductor switch.

6. The apparatus for auto-regulating the input power source of the driver of claim 1, wherein the controller comprises:
    a fourth resistor, wherein a second end of the fourth resistor is coupled to a ground voltage;
    a fifth resistor;
    a first capacitor, wherein a first end of the first capacitor is coupled to a first end of the fifth resistor, and a second end of the first capacitor is coupled to the ground voltage;
    a second capacitor, wherein a first end of the second capacitor is coupled to a first end of the fourth resistor, and a second end of the second capacitor is coupled to a second end of the fifth resistor;
    a third semiconductor switch, wherein a second source or drain electrode of the third semiconductor switch is coupled to the second voltage, a first source or drain electrode of the third semiconductor switch is coupled to the first end of the first capacitor and a first end of the fifth resistor, and the operation voltage is provided by the first source or drain electrode of the third semiconductor switch; and
    a second operational amplifier, wherein a first input end of the second operational amplifier is coupled to the detection signal, a second input end of the second operational amplifier is coupled to the second end of the fifth resistor, and an output end is coupled to a gate electrode of the third semiconductor switch,
    wherein the operation voltage varies with the magnitude of the detection signal proportionately.

7. The apparatus for auto-regulating the input power source of the driver of claim 6, wherein the third semiconductor switch is an N-TYPE semiconductor switch.

8. The apparatus for auto-regulating the input power source of the driver of claim 1, wherein the controller comprises:
    a first inductor, wherein a first end of the first inductor is coupled to the second voltage;

a second inductor, wherein a second end of the second inductor is provided to output an operation voltage;

a third capacitor, wherein a first end of the third capacitor is coupled to a second end of the second inductor, and a second end of the third capacitor is coupled to a ground voltage;

a fourth semiconductor switch, wherein a first source or drain electrode of the fourth semiconductor switch is coupled to a second end of the first inductor, and a second source or drain electrode of the fourth semiconductor switch is coupled to a first end of the second inductor;

a fifth semiconductor switch, wherein a first source or drain electrode of the fifth semiconductor switch is coupled to the second source or drain electrode of the fourth semiconductor switch, and a second source or drain electrode of the fifth semiconductor switch is coupled to a ground voltage;

a third operational amplifier, wherein the first input end of the third operational amplifier is coupled to the detection signal, and the second input end is coupled to the second end of the second inductor; and a power converter receiving an output voltage of the third operational amplifier to start the power converter, wherein a up gate driving pin of the power converter is coupled to a gate electrode of the fourth semiconductor switch, and a lower gate driving pin of the power converter is coupled to a gate electrode of the fifth semiconductor switch, wherein the operation voltage varies with the magnitude of the detection signal proportionately.

9. The apparatus for auto-regulating the input power source of the driver of claim 8, wherein the fourth semiconductor and the fifth semiconductor switches are N-TYPE semiconductor switches.

* * * * *